(12) United States Patent
Huang et al.

(10) Patent No.: US 9,693,047 B2
(45) Date of Patent: Jun. 27, 2017

(54) TRANSPARENT STEREO DISPLAY AND OPERATION METHOD THEREOF

(71) Applicant: Au Optronics Corporation, Hsinchu (TW)

(72) Inventors: Chao-Wei Huang, Taichung (TW); Wang-Shuo Kao, Hsinchu (TW); Wen-Fang Sung, New Taipei (TW); Sheng-Ju Ho, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 136 days.

(21) Appl. No.: 14/621,398

(22) Filed: Feb. 13, 2015

(65) Prior Publication Data

US 2016/0133208 A1    May 12, 2016

(30) Foreign Application Priority Data

Nov. 7, 2014  (TW) .............................. 103138733 A

(51) Int. Cl.
*H04N 13/04* (2006.01)
*G02B 27/26* (2006.01)
(Continued)

(52) U.S. Cl.
CPC ...... *H04N 13/0452* (2013.01); *G02B 27/0172* (2013.01); *G02B 27/22* (2013.01);
(Continued)

(58) Field of Classification Search
CPC  H04N 13/0452; H04N 13/04; H04N 13/0413; H04N 13/0454; G09G 3/3614; G09G 3/3666; G09G 2340/10; G09G 2320/028; G02F 1/133528; G02F 1/13363; G02F 1/136286; G02F 1/1368; G02F 1/133512; G02F 1/133514; G02B 27/22; G02B 27/0172

See application file for complete search history.

(56) References Cited

U.S. PATENT DOCUMENTS

2003/0197819 A1*  10/2003  Sunohara .......... G02F 1/133707
                                                         349/113
2010/0097449 A1*  4/2010  Jeong ................. G02B 27/2214
                                                         348/59
(Continued)

FOREIGN PATENT DOCUMENTS

CN    102566071    7/2012
CN    102750899    10/2012

*Primary Examiner* — Ibrahim Khan
(74) *Attorney, Agent, or Firm* — Jianq Chyun IP Office

(57) ABSTRACT

A transparent stereo display includes a first substrate, a second substrate, a common electrode, a display medium, and a patterned phase retardation film. A plurality of pixel structures is disposed on the first substrate. The pixel structures include a plurality of right eye pixel structures and left eye pixel structures. Each pixel structure includes a display region, a first region, and a second region. The patterned phase retardation film includes right eye polarized patterns and left eye polarized patterns. The right eye polarized patterns are disposed corresponding to the right eye pixel structures, and the left eye polarized patterns are disposed corresponding to the left eye polarized patterns. An edge of each right eye polarized pattern overlaps with the second region of the corresponding right eye pixel structure. An edge of each left eye polarized pattern overlaps with the second region of the corresponding left eye pixel structure.

16 Claims, 10 Drawing Sheets

(51) Int. Cl.
*G02F 1/13363* (2006.01)
*G02B 27/22* (2006.01)
*G02B 27/01* (2006.01)
*G09G 3/36* (2006.01)
*G02F 1/1362* (2006.01)
*G09G 3/00* (2006.01)

(52) U.S. Cl.
CPC ....... *G02F 1/13363* (2013.01); *G09G 3/3648* (2013.01); *G02B 2027/0112* (2013.01); *G02B 2027/0134* (2013.01); *G02F 1/13624* (2013.01); *G02F 1/136286* (2013.01); *G02F 2001/133631* (2013.01); *G09G 3/003* (2013.01); *G09G 2300/0439* (2013.01); *G09G 2320/028* (2013.01)

(56) References Cited

U.S. PATENT DOCUMENTS

| | | | | |
|---|---|---|---|---|
| 2010/0238097 A1* | 9/2010 | Baik | ............... | G02B 27/26 345/87 |
| 2012/0154392 A1* | 6/2012 | Kim | ............... | G02B 26/06 345/419 |
| 2013/0009941 A1* | 1/2013 | Hwang | ............... | G02B 27/26 345/212 |

\* cited by examiner

TRANSPARENT STEREO DISPLAY AND OPERATION METHOD THEREOF

CROSS-REFERENCE TO RELATED APPLICATION

This application claims the priority benefit of Taiwan application serial no. 103138733, filed on Nov. 7, 2014. The entirety of the above-mentioned patent application is hereby incorporated by reference herein and made a part of this specification.

FIELD OF THE INVENTION

The invention relates to a stereo display and an operation method thereof; more particularly, the invention relates to a transparent stereo display and an operation method thereof.

DESCRIPTION OF RELATED ART

The current technology of three-dimensional display may be roughly categorized into two types. One is an auto-stereoscopic type which allows the viewer to see directly with naked eyes and the other is a stereoscopic type which requires a viewer to wear specially designed glasses. The stereoscopic type stereo display mainly functions to display left and right eye images by adopting a display, such that a head-mounted display allows the left and right eyes to see the left and right eye images to form stereoscopic visions.

Specifically, a phase retardation film containing two types of phase retardation areas is attached to an exterior of a display panel of the stereoscopic stereo display, so that light provide by a pixel area for displaying a left eye image and light provided by a pixel area for displaying a right eye image posses different polarization states. Thus, the left eye image and the right eye image are transmitted respectively to the left eye and the right eye by the head-mounted display so as to form stereoscopic images in brains of the viewers.

However, to avoid transmitting inaccurate images to the viewers due to lights provided by the pixel areas passing obliquely through improper (non-determined) phase retardation areas, it is necessary to dispose a black matrix between two types of the phase retardation areas of the phase retardation film. In addition, a width of the black matrix must be increased so as to increase a vertical viewing angle. Thus, brightness and viewing angle scopes of two dimensional (2D) and three dimensional (3D) images which are displayed by the display are adversely reduced, and costs of the phase retardation film are increased. Accordingly, a stereo display having good transmittance in a 2D mode and an excellent vertical viewing angle in a 3D mode is urgently desired.

SUMMARY OF THE INVENTION

The invention provides a transparent stereo display, which has good transmittance when displaying 2D images and have an excellent vertical viewing angle when displaying 3D images.

The invention further provides an operation method of a transparent stereo display, which allows the transparent stereo display to have good transmittance when displaying 2D images and to have an excellent vertical viewing angle when displaying 3D images.

A transparent stereo display provided in the invention includes a transparent display panel. The transparent display panel includes a first substrate, a second substrate, a common electrode, a display medium, and a patterned phase retardation film. A plurality of pixel structures is disposed on the first substrate. The plurality of pixel structures includes a plurality of right eye pixel structures and a plurality of left eye pixel structures. Each of the pixel structures includes a display region, a first region, and a second region. The first region is located between the display region and the second region, and each of the pixel structures includes a scan line and a data line, an active device, a pixel electrode, a first transparent conductive pattern, a second transparent conductive pattern, a first signal line, and a second signal line. The active device is electrically connected to the scan line and the data line. The pixel electrode is electrically connected to the active device and is disposed in the display region. The first transparent conductive pattern is disposed in the first region. The second transparent conductive pattern is disposed in the second region. The first signal line is electrically connected to the first transparent conductive pattern. The second signal line is electrically connected to the second transparent conductive pattern. The second substrate is located opposite to the first substrate. The common electrode is disposed on the first substrate or the second substrate, and the common electrode is disposed corresponding to the pixel electrode, the first transparent conductive pattern and the second transparent conductive pattern. The display medium is located between the first substrate and the second substrate. The patterned phase retardation film is disposed on an external surface of the first substrate or an external surface of the second substrate. The pixel structure includes a plurality of right eye pixel structures and a plurality of left eye pixel structures. The patterned phase retardation film includes a plurality of right eye polarized patterns and a plurality of left eye polarized patterns. The right eye polarized patterns are disposed corresponding to the right eye pixel structures, and the left eye polarized patterns are disposed corresponding to the left eye polarized patterns. An edge of each of the right eye polarized patterns overlaps with the second region of the corresponding right eye pixel structure. An edge of each of the left eye polarized patterns overlaps with the second region of the corresponding left eye pixel structure.

An operation method of a transparent stereo display provided in the invention includes: providing the transparent stereo display; when images are displayed in a 2D mode, the first region and the second region of each of the pixel structures of the transparent display panel are in a transparent state; and when the images are displayed in a 3D mode, the first region of each of the pixel structures of the transparent display panel of the transparent panel is in the transparent state and the second region of each of the pixel structures is in a shielding state.

In view of the above, the pixel structure of the transparent stereo display of the invention has a display region, a first region, and a second region. A display state of the second region of each of the pixel structures may be switched as desired. When images are to be displayed in a 2D mode, the first region and the second region may be set in a transparent state. When images are to be displayed in a 3D mode, the first region is still in the transparent state, and the second region may be in a shielding state through voltage controls. Accordingly, the transparent stereo display of the invention and the operation method thereof may maintain good brightness when displaying 2D images, and may have an excellent vertical viewing angle when displaying 3D images.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
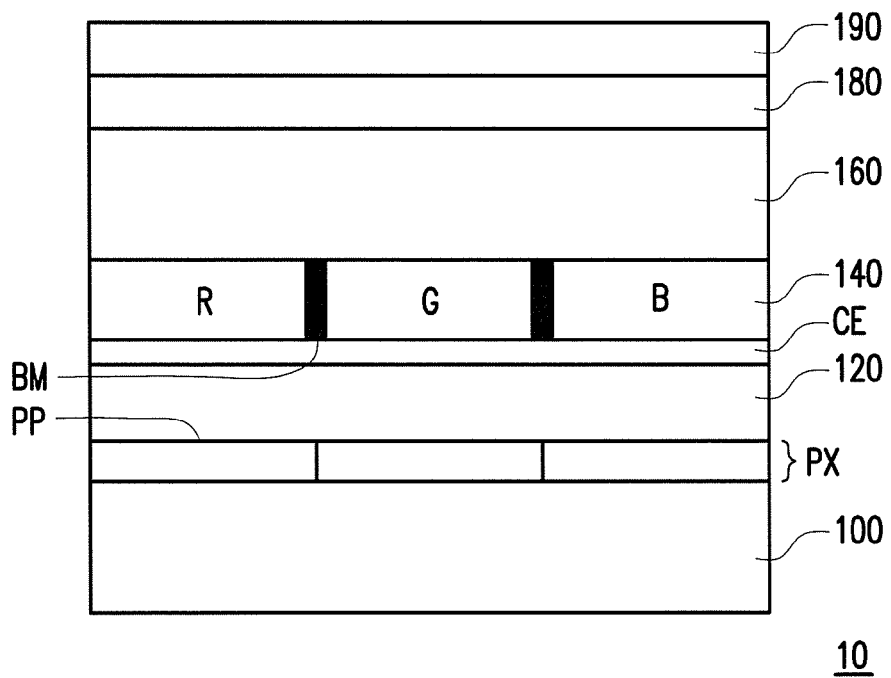
FIG. 1A is a cross-sectional view illustrating a transparent display panel according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

A transparent stereo display of the invention includes a transparent display panel. FIG. 1A is a cross-sectional view illustrating a transparent display panel according to an embodiment of the invention. With reference to FIG. 1A, a transparent display panel 10 of the present embodiment includes a first substrate 100, a display medium 120, a color filter layer 140, a second substrate 160, and a common electrode CE.

A pixel array layer PX is disposed on the first substrate 100. To facilitate illustration, FIG. 1A only illustrates three pixel structures PP. However, people of ordinary skill in the art should understand that the pixel array layer PX may substantially include more pixel structures PP. The second substrate 160 is disposed opposite to the first substrate 100. Materials of the first substrate 100 and the second substrate 160 may be glass, quartz, or organic polymers, etc. However, the invention is not limited thereto.

The display medium 120, for example, is located between the first substrate 100 and the second substrate 160. The present embodiment does not limit types of the transparent display panel 10. Functions and Mechanisms of the transparent display panel 10 may vary with varieties of the display medium 120. For example, when the display medium 120 is made of liquid crystal material, the transparent display panel 10 is a liquid crystal transparent stereo display panel. The liquid crystal transparent stereo display panel is taken as an example below to illustrate the transparent display panel 10 of the present embodiment.

As illustrated in FIG. 1A, the color filter layer 140 is located on the second substrate 160. The color filter layer 140 includes a shielding pattern BM and a plurality of color filter patterns R, G, B which are disposed corresponding to the shielding pattern BM. In the present embodiment, the color filter patterns R, G, B, for example, are respectively a red filter pattern, a green filter pattern, and a blue filter pattern. However, the invention is not limited to such arrangement. The color filter patterns R, G, B are respectively disposed corresponding to each of the pixel structures PP, such that a display region RD (detailed descriptions thereof are provided hereinafter) may generate red, green and blue lights. In the present embodiment, the shielding pattern BM is a black matrix, which has a plurality of openings, and the color filter patterns R, G, B are disposed in the openings.

Figure 1B:
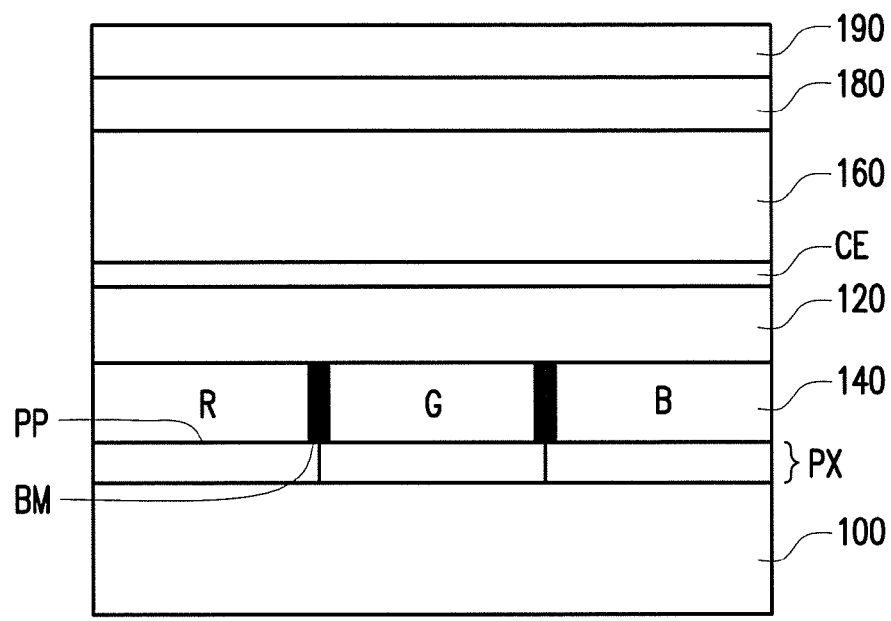
FIG. 1B is a cross-sectional view illustrating the transparent display panel according to another embodiment of the invention.

FIG. 1B is a cross-sectional view illustrating the transparent display panel according to another embodiment of the invention. A transparent display panel 10a is similar to the transparent display panel 10. Thus, the same or similar components depicted therein are labeled with the same or similar reference numbers, and are not reiterated hereinafter. A primary difference between the transparent display panel 10a and the transparent display panel 10 lies in that the color filter layer 140 is located on the first substrate 100. In general, in the embodiment in which the color filter patterns R, G, B are located on the first substrate 100, when the color filter patterns R, G, B are located above an active device, the first substrate 100 is a color filter on array (COA) substrate; and when the color filter patterns R, G, B are located below the active device, the first substrate 100 is an array on color filter (AOC) substrate.

With reference to FIGS. 1A and 1B together, in these embodiments, the common electrode CE is disposed on the second substrate 160, but the invention is not limited thereto. In other embodiments, the common electrode CE may also be disposed on the first substrate 100. A material of the common electrode CE includes metal oxide, such as indium tin oxide (ITO), indium zinc oxide (IZO), aluminum tin oxide (ATO), aluminum zinc oxide (AZO), indium germanium zinc oxide (IGZO), or any other suitable metal oxide, or a stacked layer of at least two of the above. However, the invention is not limited thereto.

The transparent display panel 10 and the transparent display panel 10a may further include an optical sheet 180 and a patterned phase retardation film 190. The optical sheet 180 may include a polarizing film. As illustrated in FIG. 1A and FIG. 1B, the optical sheet 180 is disposed on the external surface of the second substrate 160. However, the invention is not limited thereto. In other embodiments, the optical sheet 180 may also be disposed on an external surface of the first substrate 100 and the external surface of the second substrate 160. As illustrated in FIG. 1A and FIG. 1B, the patterned phase retardation film 190 is disposed on the external surface of the second substrate 160 and located on the optical sheet 180. However, the invention is not limited thereto. In other embodiments, the patterned phase retardation film 190 may also be disposed on the external surface of the first substrate 100.

Figure 2:
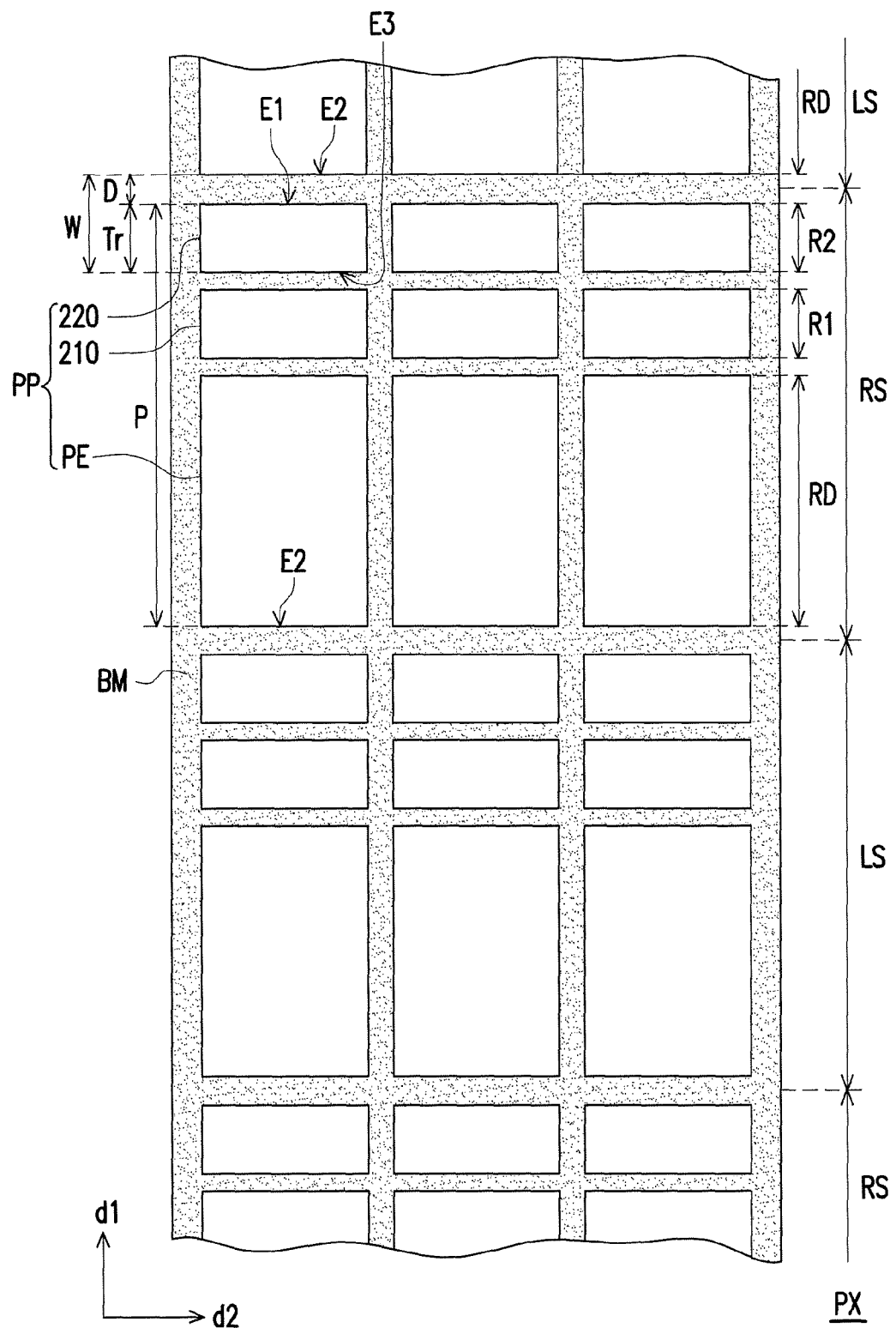
FIG. 2 is a schematic top view illustrating a pixel array of a transparent stereo display according to an embodiment of the invention.

FIG. 2 is a schematic top view illustrating a pixel array of a transparent stereo display according to an embodiment of the invention. To facilitate illustration, FIG. 2 only illustrates six pixel structures PP and omits other elements. Each of the pixel structures PP includes a display region RD, a first region R1, and a second region R2. The first region R1 is located between the display region RD and the second region R2. The invention does not limit a relative area ratio among the first region R1, the second region R2, and the display region RD. Areas of each of the above regions may be adjusted based on requirements to be displayed.

A pixel electrode PE is disposed in the display region RD. The pixel electrode PE, for example, is made of metal oxide, such as indium tin oxide (ITO), indium zinc oxide (IZO), aluminum tin oxide (ATO), aluminum zinc oxide (AZO), indium germanium zinc oxide (IGZO), or any other suitable metal oxide, or a stacked layer of at least two of the above. However, the invention is not limited thereto.

A first transparent conductive pattern 210 is disposed in the first region R1, and a second transparent conductive pattern 220 is disposed in the second region R2. It is worth to note that the color filter patterns R, G, B are not provided on the first transparent conductive pattern 210 and the second transparent conductive pattern 220. Accordingly, when images are displayed in a 2D mode, each of the first regions R1 and the second regions R2 are in a transparent state; and when the images are displayed in a 3D mode, each of the first regions R1 is in the transparent state and each of the second regions R2 is in a shielding state. The first transparent conductive pattern 210 and the second transparent conductive pattern 220, for example, are made of metal oxide, such as indium tin oxide (ITO), indium zinc oxide (IZO), aluminum tin oxide (ATO), aluminum zinc oxide (AZO), indium germanium zinc oxide (IGZO), or any other suitable metal oxide, or a stacked layer of at least two of the above. However, the invention is not limited thereto.

With reference to FIG. 1A (FIG. 1B) and FIG. 2 together, the common electrode CE is disposed corresponding to the pixel electrode PE of the pixel structure PP, the first transparent conductive pattern 210 and the second transparent conductive pattern 220. The plurality of pixel structures PP of the transparent display panel 10 may include a plurality of right eye pixel structures RS and a plurality of left eye pixel structures LS. As illustrated in FIG. 2, the right eye pixel structure RS and the left eye pixel structure LS may respectively include the plurality of pixel structures PP which corresponds to the color filter patterns R, G, B. However, the invention does not limit arrangements of the pixel structures PP.

With reference to FIG. 2 again, the right eye pixel structure RS and the left eye pixel structure LS are alternately disposed along a d1 direction, wherein the direction d1 is consistent with an extending direction of a data line DL (detailed descriptions thereof are provided hereinafter), and a direction d2 is consistent with an extending direction of a scan line SL (detailed descriptions thereof are provided hereinafter).

The shielding pattern BM is correspondingly disposed at a periphery of the display region RD of each of the pixel structures PP, a periphery of the first region R1 of each of the pixel structures PP, and a periphery of the second region R2 of each of the pixel structures PP. As illustrated in FIG. 2, the shielding pattern BM which is parallel to the direction d2 and located between the second region R2 of a pixel structure (e.g., the right eye pixel structure RS) and the display region RD of a preceding pixel structure (the left eye pixel structure LS) has a first edge E1 adjacent to the second region R2 of the pixel structure (e.g., the right eye pixel structure RS) and a second edge E2 adjacent to the display region RD of the preceding pixel structure (the left eye pixel structure LS). The shielding pattern BM which is parallel to the direction d2 and located between the second region R2 and the first region R1 of the pixel structure (e.g., the right eye pixel structure RS) has a third edge E3 adjacent to the second region R2. As illustrated in FIG. 2, a shortest distance D exists between the first edge E1 of the pixel structure (e.g., the right eye pixel structure RS) and the second edge E2 of the preceding pixel structure (the left eye pixel structure LS), and a shortest distance W exists between the second edge E2 of a preceding pixel structure (e.g., the left eye pixel structure LS) and the third edge E3 of the pixel structure (e.g., the right eye pixel structure RS).

In the transparent display panel illustrated in the embodiment of FIG. 1A (i.e., the color filter layer 140 is located on the second substrate 160), the shortest distance W may meet the following equation:

$$(W + X \times P) = 2 \frac{T}{\sqrt{n_{\textit{eff}}^2 - 1}} \qquad \text{(Equation 1)}$$

P is a distance between the first edge E1 and the second edge E2 of the pixel structure (e.g., the right eye pixel structure RS), X is a tolerance value of X-talk between a left eye and a right eye, $n_{\textit{eff}}$ is an equivalent refractive index of the second substrate 160, and T is a sum of a thickness of the color filter layer 140, a thickness of the second substrate 160, and a thickness of the optical sheet 180; particularly, a width of the second region R2 which is parallel to the direction d1 is Tr, and Tr=(the shortest distance W)–(the shortest distance D), as illustrated in FIG. 2.

In light of the above, in (Equation 1), P is the distance between the first edge E1 and the second edge E2 of the same pixel structure (e.g., the right eye pixel structure RS as illustrated in FIG. 2). X is the tolerance value of X-talk between left eye and right eye. For example, as far as a stereoscopic stereo display is concerned, X reflects a phenomenon when a viewer's left (right) eye sees an image of right (left) eye. At viewing a 3D image, the phenomenon of X-talk between left and right eyes is directly proportional to an X value. From viewpoints based on a vertical viewing angle of a stereo display, the smaller the X value is, the better. In the present embodiment, $n_{\textit{eff}}$ is the equivalent refractive index of the second substrate 160.

In the transparent display panel illustrated in the embodiment of FIG. 1B (i.e., the color filter layer 140 is located on the first substrate 100), the shortest distance W may meet the following equation:

$$(W + X \times P) = 2 \frac{T}{\sqrt{n_{\textit{eff}}^2 - 1}} \qquad \text{(Equation 1)}$$

P is the distance between the first edge E1 and the second edge E2 of the pixel structure (e.g., the right eye pixel structure RS), X is the tolerance value of X-talk between the left eye and the right eye, $n_{eff}$ is the equivalent refractive index of the second substrate 160, and T is the sum of the thickness of the second substrate 160 and the thickness of the optical sheet 180, particularly, the width of the second region R2 which is parallel to the direction d1 is Tr, and Tr=(the shortest distance W)−(the shortest distance D), as illustrated in FIG. 2.

More specifically, if the color filter layer 140 is located on the first substrate 100 (as illustrated in FIG. 1B), T is the sum of the thickness of the second substrate 160 and the thickness of the optical sheet 180. If the color filter layer 140 is located on the second substrate 160 (as illustrated in FIG. 1A), T is the sum of the thickness of the color filter layer 140, the thickness of the second substrate 160 and the thickness of the optical sheet 180.

Figure 3A:
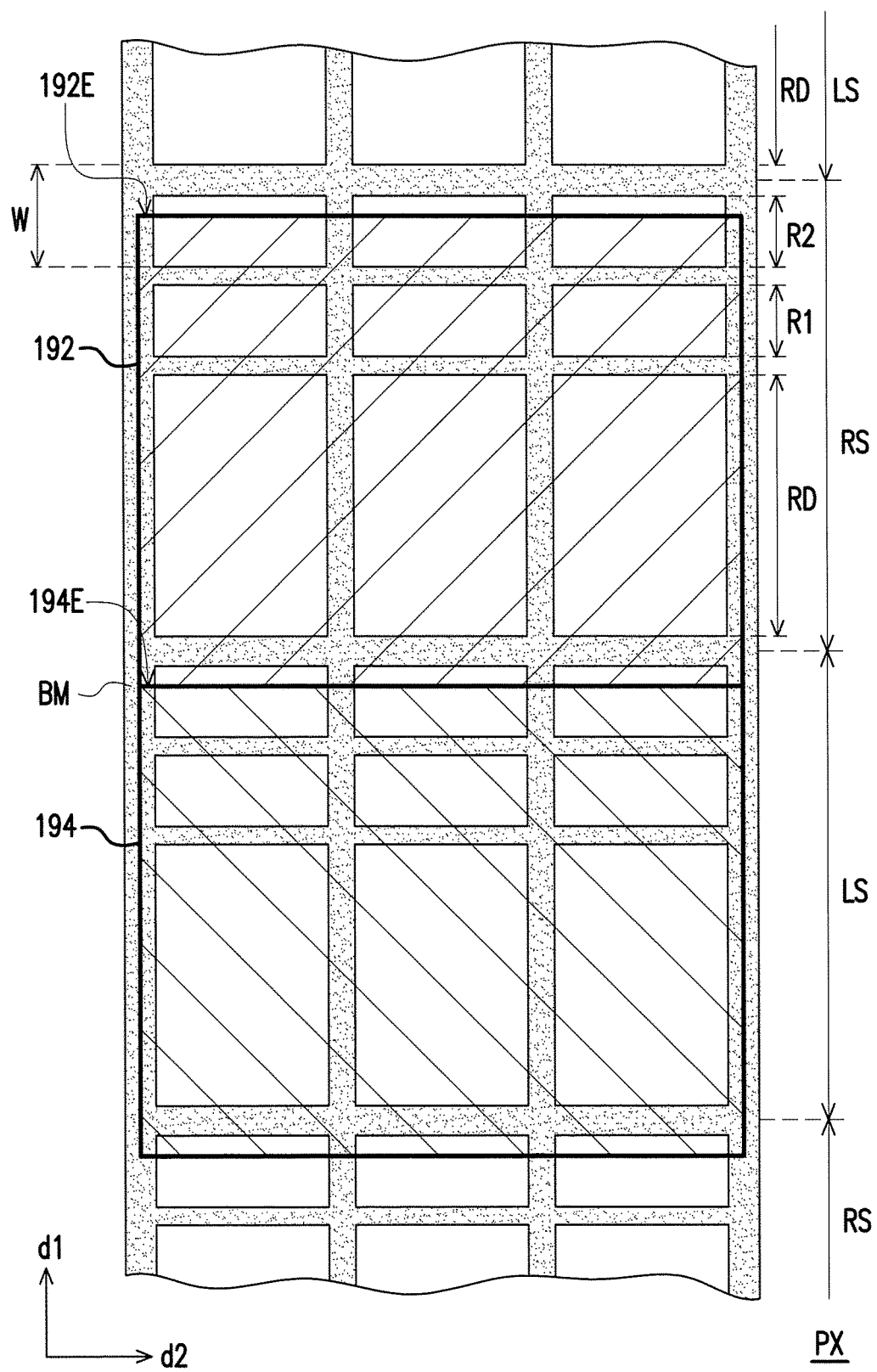
FIG. 3A is a schematic view illustrating a transparent stereo display in a two-dimensional (2D) display status according to an embodiment of the invention.

FIG. 3A is a schematic view illustrating a transparent stereo display in a two-dimensional (2D) display status according to an embodiment of the invention. Then, with reference to FIG. 2 and FIG. 3A together, the patterned phase retardation film 190 of the present embodiment may include a plurality of right eye polarized patterns 192 and a plurality of left eye polarized patterns 194. The right eye polarized patterns 192 are disposed corresponding to the right eye pixel structures RS, and the left eye polarized patterns 194 are disposed corresponding to the left eye pixel structures LS. The right eye polarized pattern 192 has an edge 192E which is parallel to the direction d2, as shown in FIG. 3A. The edge 192E of the right eye polarized pattern 192 overlaps with the second regions R2 of the corresponding right eye pixel structures RS. Likewise, the left eye polarized pattern 194 has an edge 194E which is parallel to the direction d2. The edge 194E of the left eye polarized pattern 194 overlaps with the second regions R2 of the corresponding left eye pixel structures LS. In the present embodiment, from viewpoints based on a vertical viewing angle of a stereo display, the edge 192E of the right eye polarized pattern 192 of the patterned phase retardation film 190 falls in ½ of the shortest distance W (i.e., a middle position of the shortest distance W), and the edge 194E of the left eye polarized pattern 194 of the patterned phase retardation film 190 falls in ½ of the shortest distance W, but the invention is not limited thereto.

It is concluded from the above that, in the transparent stereo display of the present embodiment, the shortest distance W is obtained first by adopting the above equation (Equation 1) and then the width Tr of the second region R2 may further be obtained. Accordingly, an optimized position for the patterned phase retardation film 190 may be obtained.

Figure 3B:
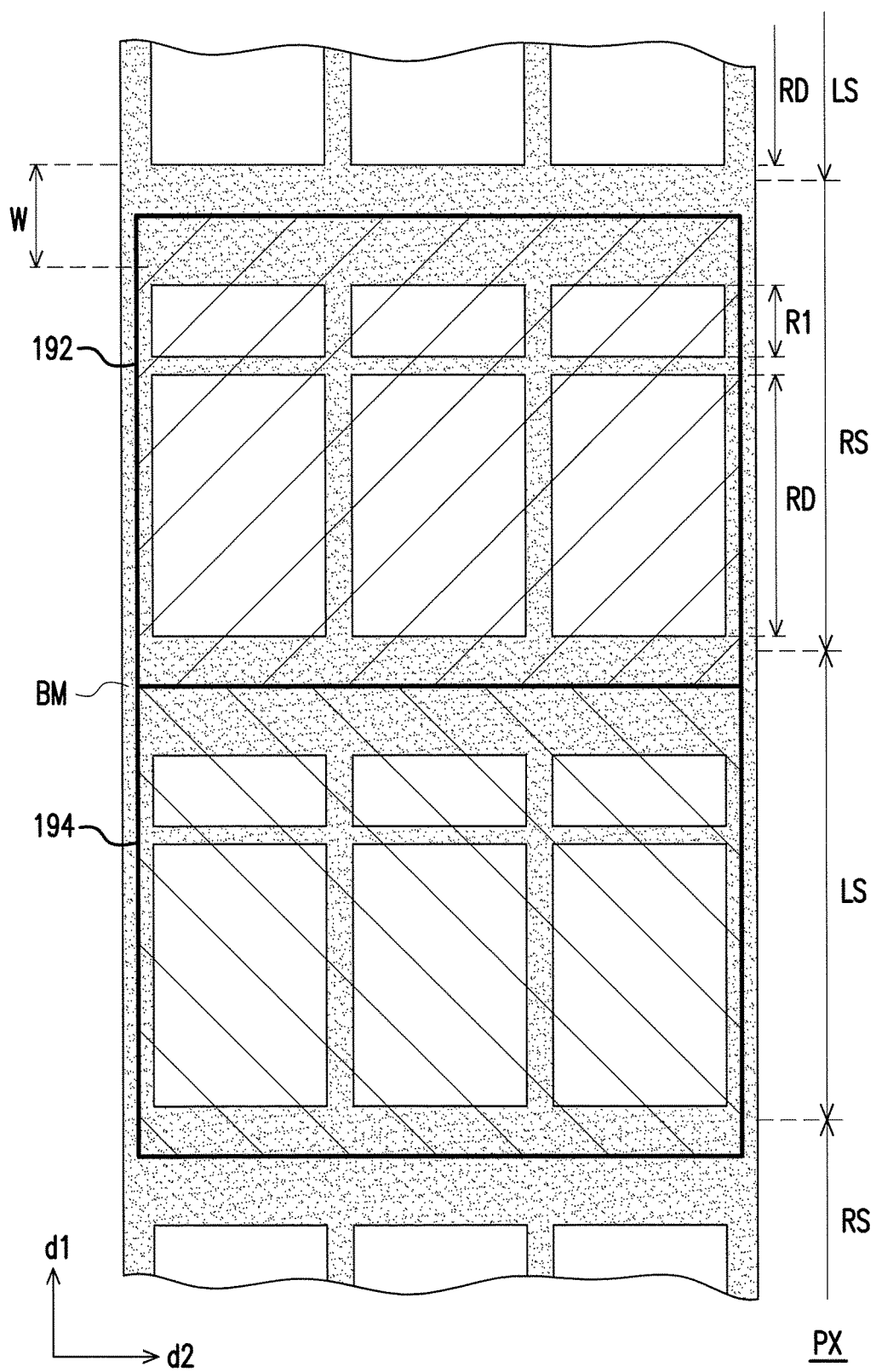
FIG. 3B is a schematic view illustrating a transparent stereo display in a three-dimensional (3D) display status according to an embodiment of the invention.

With reference to FIG. 3A again, when the transparent display panel 10 is in the 2D display status, both the first region R1 and the second region R2 are in a transparent state. FIG. 3B is a schematic view illustrating a transparent stereo display in a three-dimensional (3D) display status according to an embodiment of the invention. Then, with reference to FIG. 3B, when the transparent display panel 10 is in the 3D display status, the second region R2 may be switched to a shielding state while the first region R1 may still be maintained in a transparent state. Accordingly, the second region R2 in the shielding state may provide effects of a widened shielding pattern BM, and further reducing phenomenon of X-talk between left and right eyes and increasing a vertical viewing angle when 3D images are displayed. In addition, since both the first region R1 and the second region R2 are in the transparent state when 2D images are displayed, a transmittance of the transparent display panel 10 may be maintained and the transparent display panel 10 may further obtain excellent display brightness.

Figure 4:
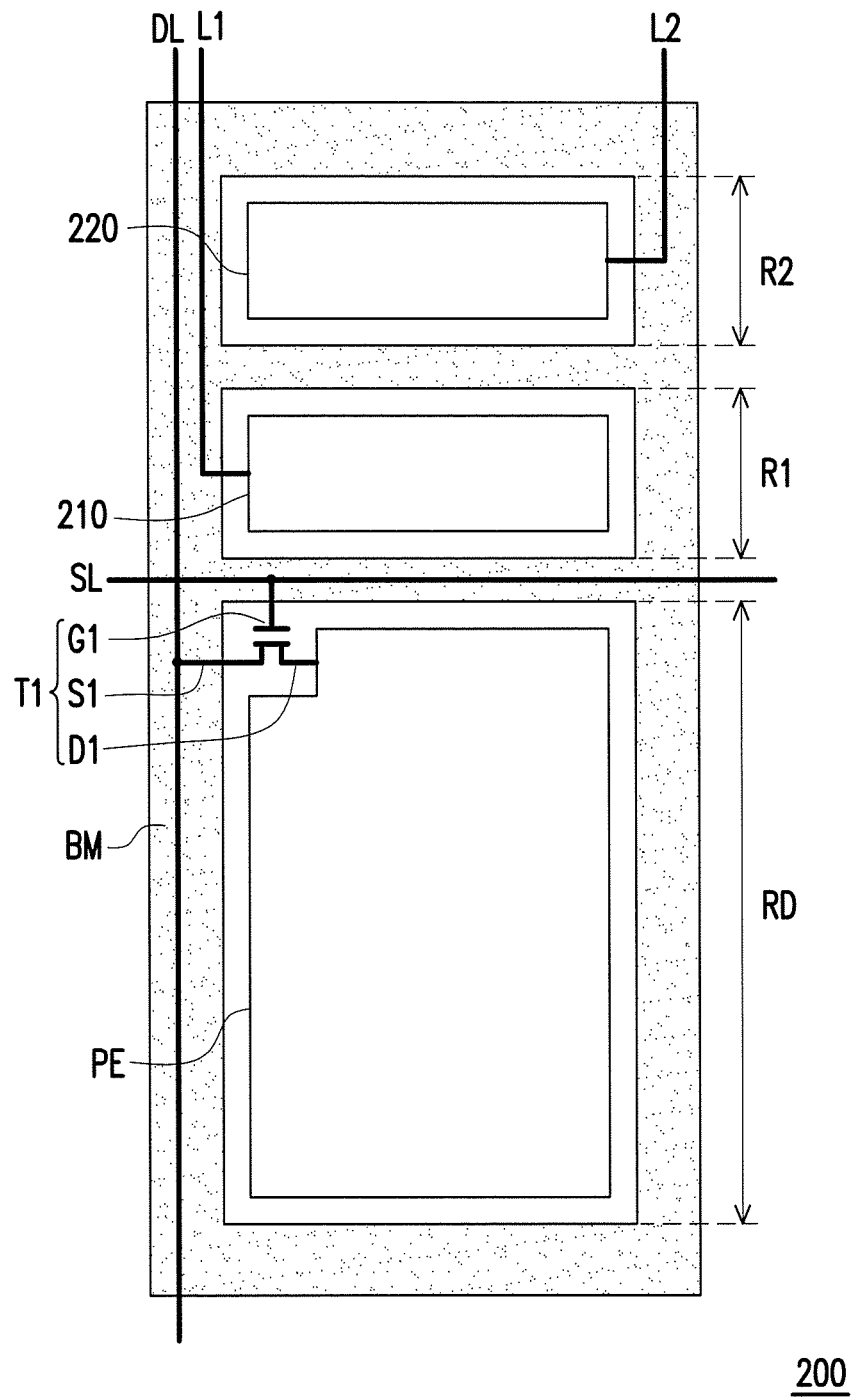
FIG. 4 is a schematic top view illustrating a pixel structure of a transparent stereo display according to a first embodiment of the invention.

Pixel structures illustrated in each embodiment of the invention will now be described in detail with reference to the accompanying drawings. FIG. 4 is a schematic top view illustrating a pixel structure of a transparent stereo display according to a first embodiment of the invention. With reference to FIG. 4, a pixel structure 200 includes the display region RD, the first region R1, and the second region R2. The first region R1 is located between the display region RD and the second region R2. The invention does not limit a relative area ratio among the first region R1, the second region R2, and the display region RD. Areas of each of the above regions may be adjusted as desired. The pixel structure 200 includes the scan line SL and the data line DL, an active device T1, the pixel electrode PE, the first transparent conductive pattern 210, the second transparent conductive pattern 220, a first signal line L1, a second signal line L2, and a common electrode (not shown).

The active device T1 is electrically connected to the scan line SL and the data line DL. The extending direction of the data line DL is consistent with the direction d1 as shown in FIG. 2, and the extending direction of the scan line SL is consistent with the direction d2 as shown in FIG. 2. The active device T1 may be a bottom-gate thin film transistor (TFT) or a top-gate TFT, which includes a gate G1, a source S1, and a drain D1. The gate G1 is electrically connected to the scan line SL. The source S1 is electrically connected to the data line DL. The drain D1 is electrically connected to the pixel electrode PE.

The pixel electrode PE is disposed in the display region RD. The first transparent conductive pattern 210 is disposed in the first region R1. The second transparent conductive pattern 220 is disposed in the second region R2. The first signal line L1 is electrically connected to the first transparent conductive pattern 210. The second signal line L2 is electrically connected to the second transparent conductive pattern 220. In the present embodiment, the first signal line L1 and the second signal line L2 may be fabricated together with the data line DL at the same time, but the invention is not limited thereto. The common electrode is disposed corresponding to the pixel electrode PE, the first transparent conductive pattern 210 and the second transparent conductive pattern 220.

It is worth to note that, in the present embodiment, the first transparent conductive pattern 210 and the second transparent conductive pattern 220 of the pixel structure 200 are electrically controlled by the first signal line L1 and the second signal line L2, respectively. When 2D images are displayed, the first region R1 and the second region R2 are in a transparent state. When 3D images are displayed, the second region R2 may be switched to a shielding state by the second signal line L2 which is electrically connected to the second transparent conductive pattern 220. Accordingly, the second region R2 in the shielding state may provide effects of a widened shielding pattern BM, thereby reducing phenomenon of X-talk between left and right eyes and increasing a vertical viewing angle when 3D images are displayed. In addition, since both the first region R1 and the second region R2 are in a transparent state when 2D images are displayed, a transmittance of the transparent display panel 10 may be maintained and the transparent display panel 10 may further obtain excellent display brightness.

Figure 5:
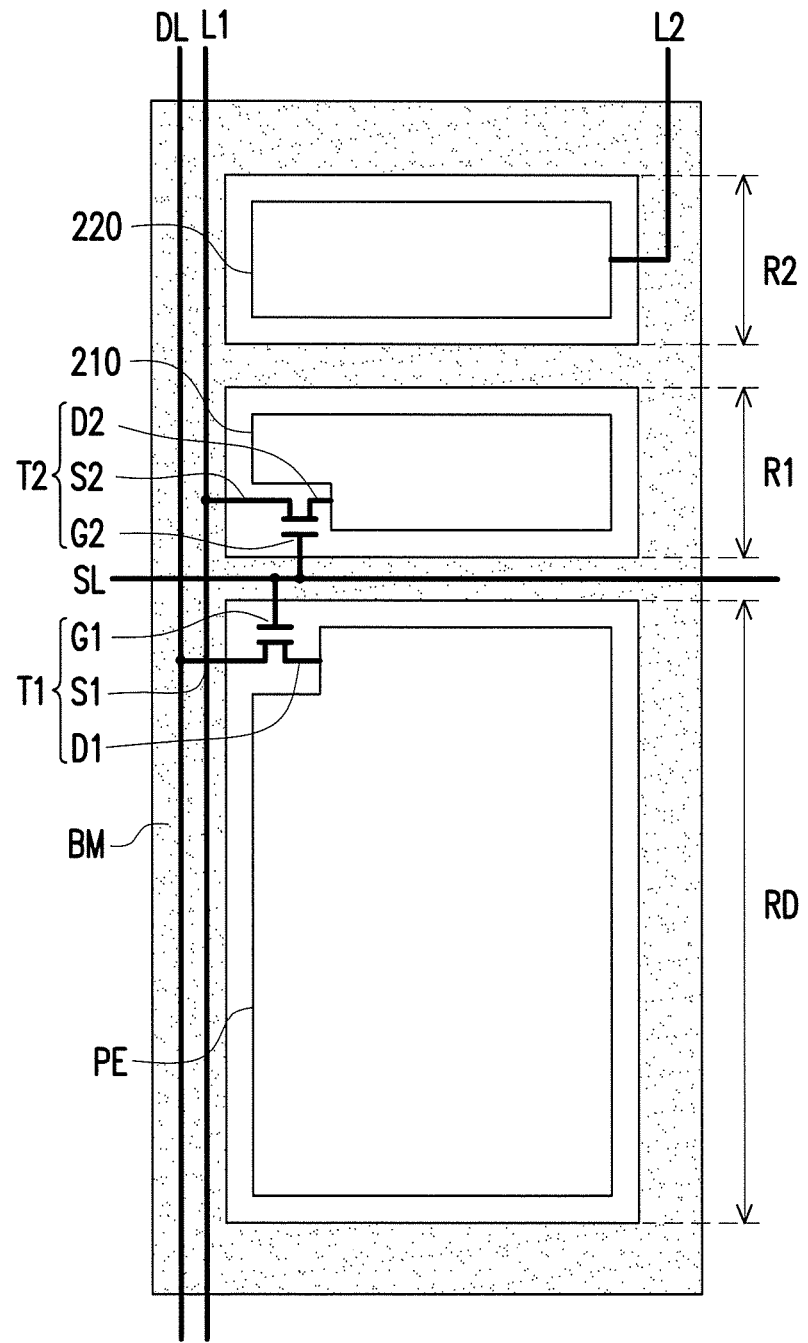
FIG. 5 is a schematic top view illustrating a pixel structure of a transparent stereo display according to a second embodiment of the invention.

FIG. 5 is a schematic top view illustrating a pixel structure of a transparent stereo display according to a second embodiment of the invention. With reference to FIG. 5, a pixel structure 300 of the present embodiment is similar to the pixel structure 200 of FIG. 4. Thus, the same or similar components depicted therein are labeled with the same or similar reference numbers, and are not reiterated hereinafter. A difference between the pixel structure 300 and the pixel structure 200 lies in that the pixel structure 300 further includes a switch element T2. Similarly, the switch element T2 includes a gate G2, a source S2 and a drain D2. The gate G2 is electrically connected to the scan line SL. The source S2 is electrically connected to the first signal line L1. In the present embodiment, the first signal line L1 is the data line DL, and the first signal line L1 may be fabricated together with the data line DL at the same time. The drain D2 of the switch element T2 is electrically connected to the first transparent conductive pattern 210 in the first region R1.

Particularly, in the present embodiment, the first transparent conductive pattern 210 of the pixel structure 300 may be electrically controlled by the switch element T2, while the second transparent conductive pattern 220 may be electrically controlled by the second signal line L2. When 2D images are displayed, the first region R1 and the second region R2 are in a transparent state. When 3D images are displayed, the second region R2 may be switched to a shielding state by the second signal line L2, thereby maintaining the first region R1 in the transparent state by the switch element T2. Accordingly, the second region R2 in the shielding state may provide effects of a widened shielding pattern BM, thereby reducing phenomenon of X-talk between left and right eyes and increasing a vertical viewing angle when 3D images are displayed. In addition, since both the first region R1 and the second region R2 are in the transparent state when the 2D images are displayed, a transmittance of the transparent display panel 10 may be maintained and the transparent display panel 10 may further obtain excellent display brightness.

Figure 6:
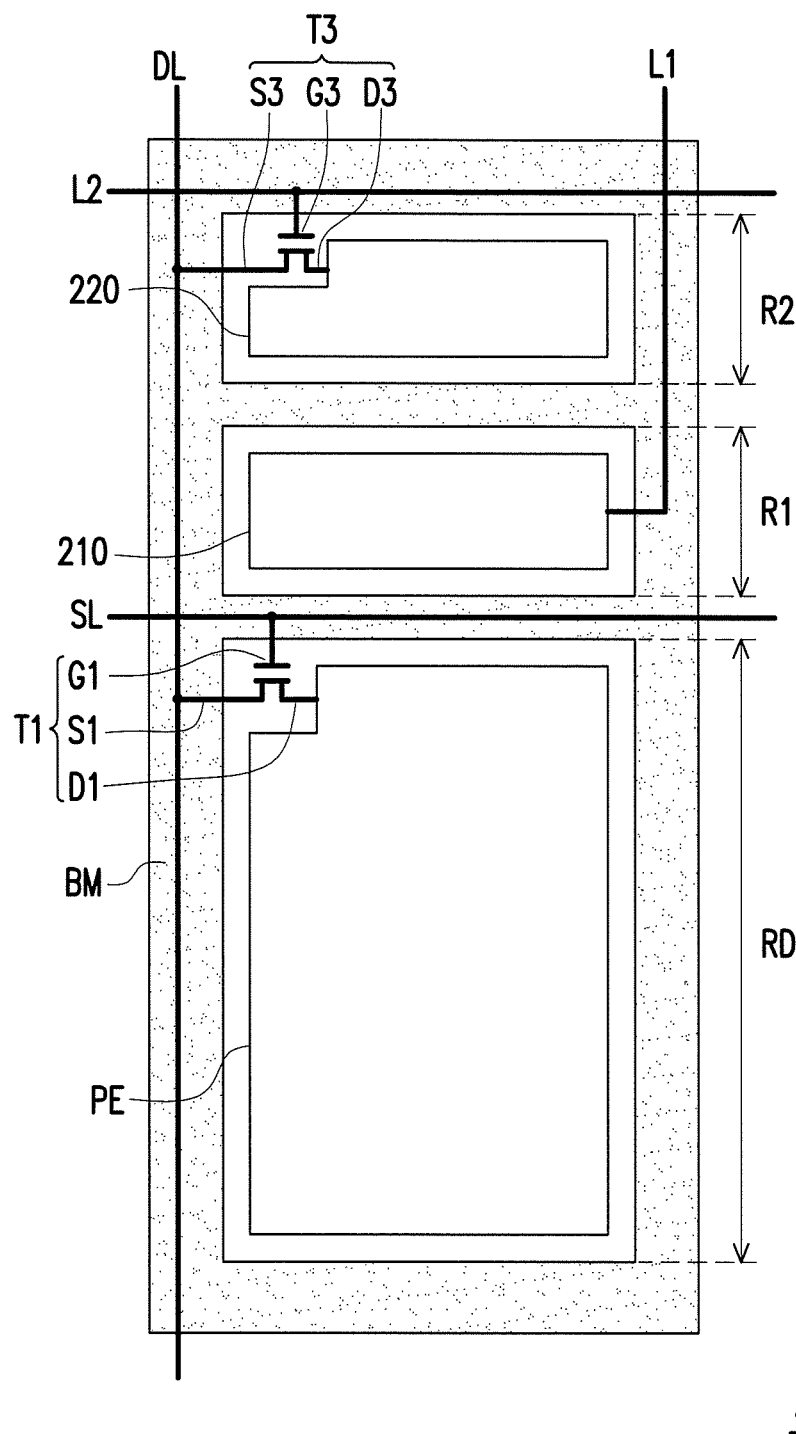
FIG. 6 is a schematic top view illustrating a pixel structure of a transparent stereo display according to a third embodiment of the invention.

FIG. 6 is a schematic top view illustrating a pixel structure of a transparent stereo display according to a third embodiment of the invention. With reference to FIG. 6, a pixel structure 400 of the present embodiment is similar to the pixel structure 200 of FIG. 4. Thus, the same or similar components depicted therein are labeled with the same or similar reference numbers, and are not reiterated hereinafter. A difference between the pixel structure 400 and the pixel structure 200 lies in that the pixel structure 400 further includes a switch element T3. Similarly, the switch element T3 includes a gate G3, a source S3 and a drain D3. The switch element T3 is electrically connected to the data line DL and the second signal line L2. More specifically, the gate G3 of the switch element T3 is electrically connected to the second signal line L2, and the source S3 of the switch element T3 is electrically connected to the data line DL. In the present embodiment, the second signal line L2 is the scan line SL, and the second signal line L2 may be fabricated together with the scan line SL at the same time. The drain D3 of the switch element T3 is electrically connected to the second transparent conductive pattern 220.

Particularly, in the present embodiment, the second transparent conductive pattern 220 of the pixel structure 400 may be electrically controlled by the switch element T3, while the first transparent conductive pattern 210 may be electrically controlled by the first signal line L1. When 2D images are displayed, both the first region R1 and the second region R2 are in a transparent state. When 3D images are displayed, the second region R2 may be switched to a shielding state by the switch element T3, thereby maintaining the first region R1 in the transparent state by the first signal line L1. Accordingly, the second region R2 in the shielding state may provide effects of a widened shielding pattern BM, thereby reducing phenomenon of X-talk between left and right eyes and increasing a vertical viewing angle when the 3D images are displayed. In addition, since both the first region R1 and the second region R2 are in the transparent state when 2D images are displayed, a transmittance of the transparent display panel 10 may be maintained and the transparent display panel 10 may further obtain excellent display brightness.

Figure 7:
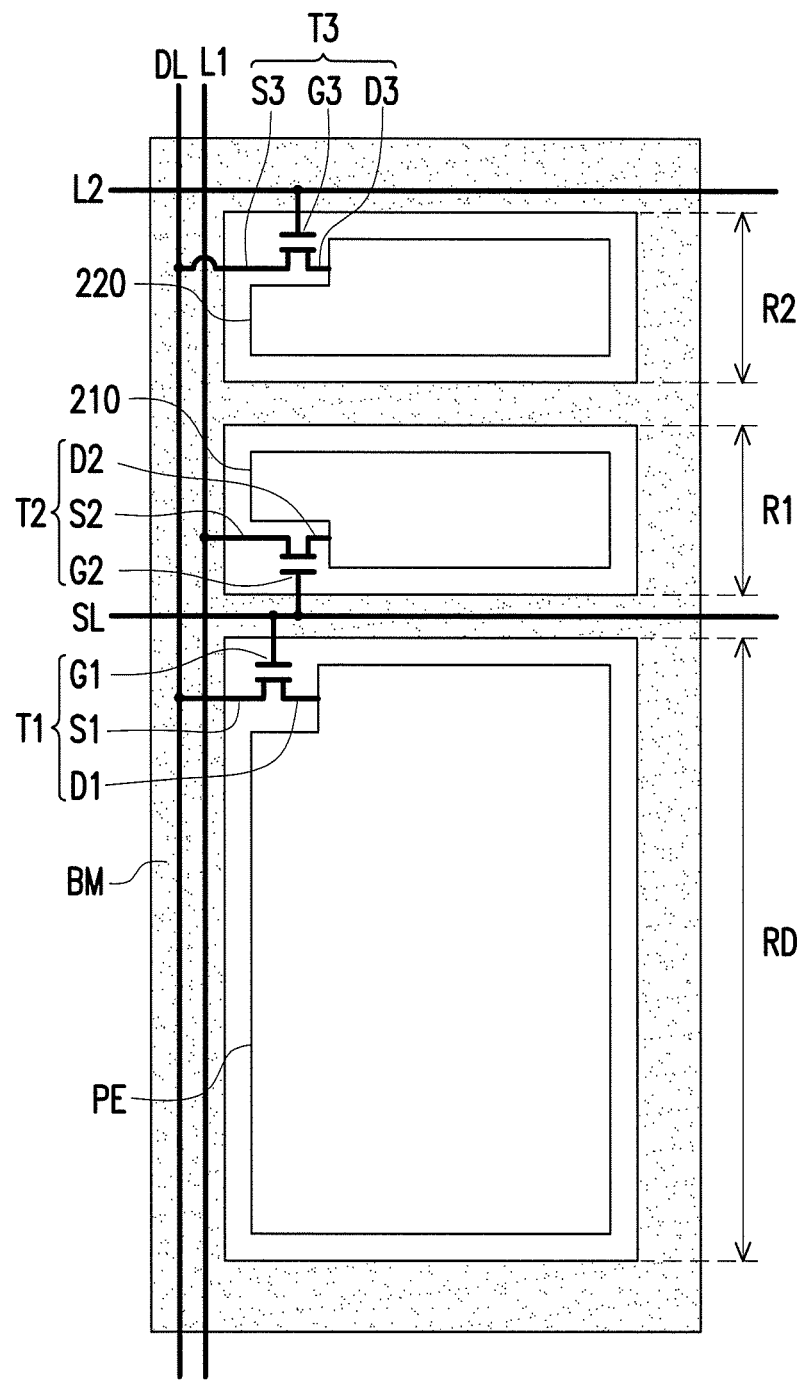
FIG. 7 is a schematic top view illustrating a pixel structure of a transparent stereo display according to a fourth embodiment of the invention.

FIG. 7 is a schematic top view illustrating a pixel structure of a transparent stereo display according to a fourth embodiment of the invention. With reference to FIG. 7, a pixel structure 500 of the present embodiment is similar to the pixel structure 200 of FIG. 2. Thus, the same or similar components depicted therein are labeled with the same or similar reference numbers, and are not reiterated hereinafter. A difference between the pixel structure 500 and the pixel structure 200 lies in that the pixel structure 500 includes not only the active device T1 but also a switch element T2 and a switch element T3. The switch element T2 is electrically connected to the scan line SL and the first signal line L1, wherein the first transparent conductive pattern 210 is electrically connected to the switch element T2. The switch element T3 is electrically connected to the data line DL and the second signal line L2, wherein the second transparent conductive pattern 220 is electrically connected to the switch element T3. In the present embodiment, the first signal line L1 is the data line DL, and the second signal line L2 is the scan line SL. The first signal line L1 may be fabricated together with the data line DL at the same time, and the second signal line L2 may be fabricated together with the scan line SL at the same time.

Particularly, in the present embodiment, the first transparent conductive pattern 210 of the pixel structure 500 may be electrically controlled by the switch element T2, while the second transparent conductive pattern 220 may be electrically controlled by the switch element T3. When 2D images are displayed, both the first region R1 and the second region R2 are in a transparent state. When 3D images are displayed, the second region R2 may be switched to a shielding state by the switch element T3, thereby maintaining the first region R1 in a transparent state by the switch element T2. Accordingly, the second region R2 in the shielding state may provide effects of a widened shielding pattern BM, thereby reducing phenomenon of X-talk between left and right eyes and increasing a vertical viewing angle when 3D images are displayed. In addition, since both the first region R1 and the second region R2 are in the transparent state when 2D images are displayed, a transmittance of the transparent display panel 10 may be maintained and the transparent display panel 10 may further obtain excellent display brightness.

Figure 8:
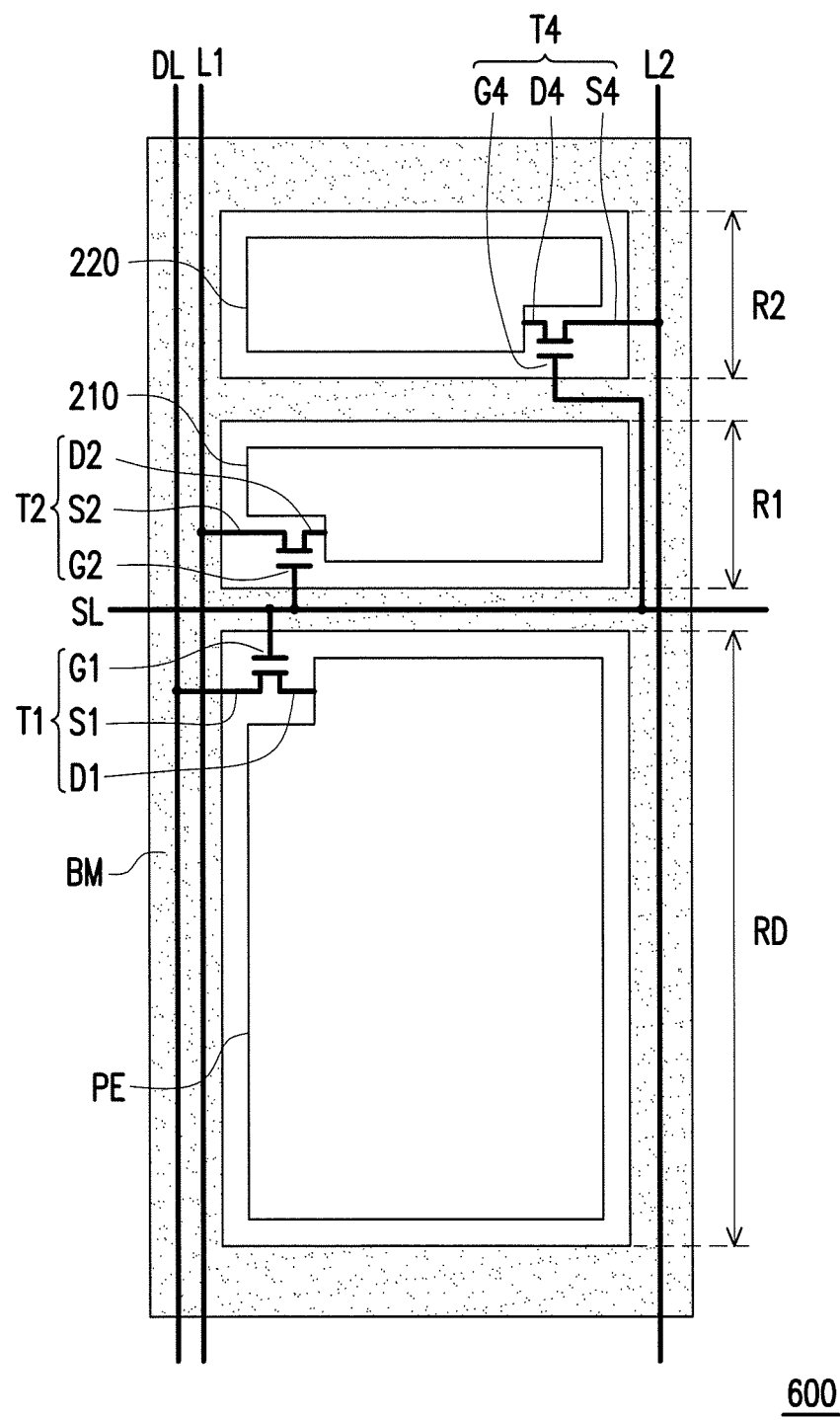
FIG. 8 is a schematic top view illustrating a pixel structure of a transparent stereo display according to a fifth embodiment of the invention.

FIG. 8 is a schematic top view illustrating a pixel structure of a transparent stereo display according to a fifth embodiment of the invention. With reference to FIG. 8, a pixel structure 600 of the present embodiment is similar to the pixel structure 200 of FIG. 2. Thus, the same or similar components depicted therein are labeled with the same or similar reference numbers, and are not reiterated hereinafter. A difference between the pixel structure 600 and the pixel structure 200 lies in that the pixel structure 600 includes not only the active device T1 but also a switch element T2 and a switch element T4. The switch element T2 is electrically connected to the scan line SL and the first signal line L1, wherein the first transparent conductive pattern 210 is electrically connected to the switch element T2. Similarly, the switch element T4 includes a gate G4, a source S4 and a drain D4. The switch element T4 is electrically connected to the scan line SL and the second signal line L2. More specifically, the gate G4 of the switch element T4 is electrically connected to the scan line SL, and the source S4 of the switch element T4 is electrically connected to the second signal line L2. The drain D4 of the switch element T4 is electrically connected to the second transparent conductive pattern 220. In the present embodiment, both the first signal line L1 and the second signal line L2 are the data line DL, and the first signal line L1 and the second signal line L2 may be fabricated together with the data line DL at the same time.

Similarly, in the present embodiment, the first transparent conductive pattern 210 of the pixel structure 600 may be electrically controlled by the first switch element T2, while the second transparent conductive pattern 220 may be electrically controlled by the switch element T4. When 2D images are displayed, both the first region R1 and the second region R2 are in a transparent state. When 3D images are displayed, the second region R2 may be switched to a shielding state by the switch element T4, thereby maintaining the first region R1 in the transparent state by the first switch element T2. Accordingly, the second region R2 in the shielding state may provide effects of a widened shielding pattern BM, thereby reducing phenomenon of X-talk between left and right eyes and increasing a vertical viewing angle when 3D images are displayed. In addition, since both the first region R1 and the second region R2 are in the transparent state when 2D images are displayed, a transmittance of the transparent display panel 10 may be maintained and the transparent display panel 10 may further obtain excellent display brightness.

Figure 9:
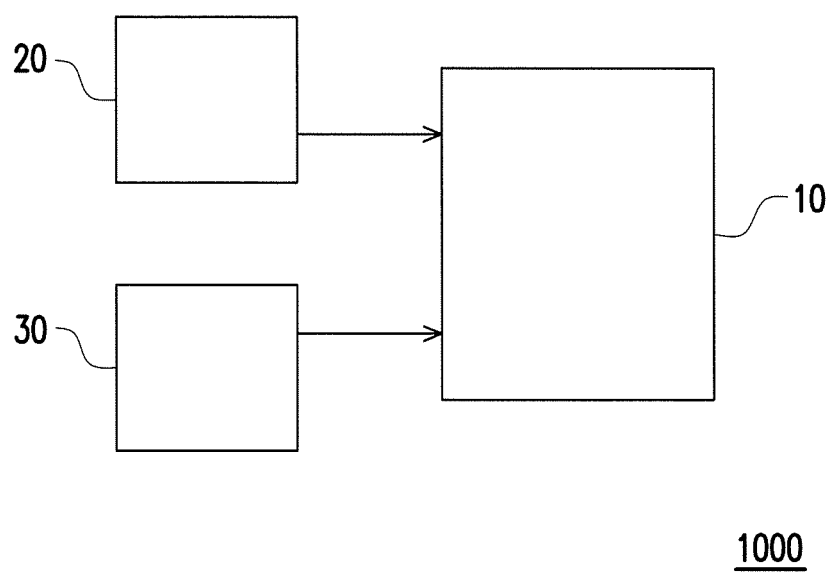
FIG. 9 is a schematic view illustrating a transparent stereo display according to an embodiment of the invention.

FIG. 9 is a schematic view illustrating a transparent stereo display according to an embodiment of the invention. With reference to FIG. 9, the following describes an operation method of a transparent stereo display according to an embodiment of the invention.

First, as shown in FIG. 9, a transparent stereo display 1000 is provided. The transparent stereo display 1000 includes a transparent display panel 10, an image control device 20, and a 2D/3D mode switch control device 30. The transparent display panel 10 may include any of the pixel structures 200, 300, 400, 500 or 600 of any of the above embodiments, but the invention is not limited thereto. The image control device 20 is electrically connected to the scan line SL and the data line DL of each of the pixel structures PP of the transparent display panel 10. The 2D/3D mode switch control device 30 is electrically connected to the first signal line L1 and the second signal line L2 of each of the pixel structures PP of the transparent display panel 10.

It is worth to note that the transparent stereo display 1000 is a switchable two and three dimensional stereo display. When 2D images are displayed in a 2D mode, the first region R1 and the second region R2 of each of the pixel structures PP of the transparent display panel 10 are in a transparent state (as shown in FIG. 3A). A specific operation method is as follows: when the 2D images are displayed in a 2D mode, 2D image signals are inputted by the image control device 20 to the display region RD of the pixel structure PP of the transparent display panel 10 so as to display the 2D images. In the meantime, 2D control signals are inputted by the 2D/3D mode switch control device 30, such that the first region R1 and the second region R2 of each of the pixel structures PP are in a transparent state.

When 3D images are displayed in a 3D mode, the first region R1 of each of the pixel structures PP of the transparent display panel 10 is in a transparent state, and the second region R2 of each of the pixel structures PP is in a shielding state (as shown in FIG. 3B). A specific operation method is as follows: when the 3D images are displayed in a 3D mode, 3D image signals are inputted by the image control device 20 to the display region RD of the pixel structure PP of the transparent display panel 10 so as to display the 3D images. In the meantime, 3D control signals are inputted by the 2D/3D mode switch control device 30, such that the first region R1 of each of the pixel structures PP is in the transparent state and the second region R2 of each of the pixel structures PP is in the shielding state.

It is worth to note that the invention does not limit methods for electrically controlling the first region R1 and the second region R2. For example, the first region R1 and the second region R2 may be electrically controlled by using only two signal lines, respectively. Alternatively, the first region R1 and/or the second region R2 may also be electrically controlled by using, for example, switch elements.

In summary, the pixel structure of the transparent stereo display of the invention has a display region, a first region, and a second region. The first region and the second region of each of the pixel structures may have independent voltage supplies, respectively, and may be switched to a display state of the second region as desired. When images are to be displayed in a 2D mode, the first region R1 and the second region R2 may be set in a transparent state. When images are to be displayed in a 3D mode, the first region R1 is still in the transparent state, and the second region R2 may be in a shielding state through voltage controls. Accordingly, the transparent stereo display of the invention and the operation method thereof may maintain good brightness when displaying the 2D images, and may have an excellent vertical viewing angle when displaying 3D images.

Although the invention has been disclosed with reference to the aforesaid embodiments, they are not intended to limit the invention. It will be apparent to those skilled in the art that various modifications and variations can be made to the structure of the disclosed embodiments without departing from the scope or spirit of the invention. In view of the foregoing, it is intended that the disclosure cover modifications and variations of the specification provided they fall within the scope of the following claims and their equivalents.

What is claimed is:

1. A transparent stereo display, comprising a transparent display panel, the transparent display panel comprising:
a first substrate, a plurality of pixel structures being disposed on the first substrate, wherein each of the pixel structures comprises a display region, a first region, and a second region, the first region is located between the display region and the second region, and each of the pixel structures comprises:
a data line and a scan line, extending respectively along a first direction and a second direction;
an active device, electrically connected to the data line and the scan line; a pixel electrode, electrically connected to the active device and disposed in the display region;
a first transparent conductive pattern, disposed in the first region; a second transparent conductive pattern, disposed in the second region; a first signal line, electrically connected to the first transparent conductive pattern; and a second signal line, electrically connected to the second transparent conductive pattern; a second substrate, located opposite to the first substrate;

a color filter layer, wherein the color filter layer comprises a shielding pattern and a plurality of color filter patterns disposed corresponding to the shielding pattern, and the color filter patterns are disposed corresponding to each of the pixel structures, and the color filter patterns are not provided on tops of the first transparent conductive pattern and the second transparent conductive pattern;

a common electrode, disposed on the first substrate or the second substrate, and disposed corresponding to the pixel electrode, the first transparent conductive pattern and the second transparent conductive pattern;

a display medium, located between the first substrate and the second substrate; and a patterned phase retardation film, disposed on an external surface of the second substrate, the patterned phase retardation film comprising a plurality of right eye polarized patterns and a plurality of left eye polarized patterns, and the pixel structures comprising a plurality of right eye pixel structures and a plurality of left eye pixel structures, the right eye polarized patterns disposed corresponding to the right eye pixel structures, the left eye polarized patterns disposed corresponding to the left eye pixel structures, wherein an edge of each of the right eye polarized patterns overlaps with the second region of the corresponding right eye pixel structure, and an edge of each of the left eye polarized patterns overlaps with the second region of the corresponding left eye pixel structure, wherein each of the right pixel structures and the left eye pixel structures comprises the display region, the first region, and the second region.

2. The transparent stereo display as claimed in claim 1, wherein the color filter layer is located on the first substrate.

3. The transparent stereo display as claimed in claim 2, the transparent display panel further comprising an optical sheet located at the external surface of the second substrate, wherein:

the shielding pattern is correspondingly disposed at a periphery of the display region of the each of the pixel structures, a periphery of the first region of the each of the pixel structures, and a periphery of the second region of the each of the pixel structures;

the shielding pattern located between the second region of the each of the pixel structures and the display region of a preceding pixel structure on the first direction has a first edge adjacent to the second region of the each of the pixel structures and a second edge adjacent to the display region of the preceding pixel structure, and the shielding pattern located between the second region and the first region of the each of the pixel structures has a third edge adjacent to the second region of the each of the pixel structures;

a shortest distance D exists between the first edge of the each of the pixel structures and the second edge of the preceding pixel structure on the first direction;

a shortest distance W exists between the third edge of the each of the pixel structures and the second edge of the preceding pixel structure on the first direction, and $$(W + X \times P) = 2 \frac{T}{\sqrt{n_{eff}^2 - 1}}$$

P is a distance between the first edge and the second edge of the each of the pixel structures, X is a tolerance value of X-talk between left eye and right eye, $n_{eff}$ is an equivalent refractive index of the second substrate, and T is a sum of a thickness of the second substrate and a thickness of the optical sheet, wherein a width of the second region is Tr, and Tr=(the shortest distance W)−(the shortest distance D).

4. The transparent stereo display as claimed in claim 3, wherein the edge of the right eye polarized pattern falls in ½ of the shortest distance W.

5. The transparent stereo display as claimed in claim 3, wherein the optical sheet comprises a polarizing film.

6. The transparent stereo display as claimed in claim 1, wherein the color filter layer is located on the second substrate.

7. The transparent stereo display as claimed in claim 6, the transparent display panel further comprising an optical sheet located at the external surface of the second substrate, wherein:

the shielding pattern is correspondingly disposed at a periphery of the display region of the each of the pixel structures, a periphery of the first region of the each of the pixel structures, and a periphery of the second region of the each of the pixel structures;

the shielding pattern located between the second region of the each of the pixel structures and the display region of a preceding pixel structure on the first direction has a first edge adjacent to the second region of the each of the pixel structures and a second edge adjacent to the display region of the preceding pixel structure, and the shielding pattern located between the second region and the first region of the each of the pixel structures has a third edge adjacent to the second region of the each of the pixel structures;

a shortest distance D exists between the first edge of the each of the pixel structures and the second edge of the preceding pixel structure on the first direction;

a shortest distance W exists between the third edge of the each of the pixel structures and the second edge of the preceding pixel structure on the first direction, and $$(W + X \times P) = 2 \frac{T}{\sqrt{n_{eff}^2 - 1}}$$

P is a distance between the first edge and the second edge of the each of the pixel structures, X is the tolerance value of X-talk between the left eye and the right eye, $n_{eff}$ is an equivalent refractive index of the second substrate, and T is a sum of a thickness of the color filter layer, a thickness of the second substrate and a thickness of the optical sheet, wherein a width of the second region is Tr, and Tr=(the shortest distance W)−(the shortest distance D).

8. The transparent stereo display as claimed in claim 6, wherein the edge of the right eye polarized pattern falls in ½ of the shortest distance W.

9. The transparent stereo display as claimed in claim 6, wherein the optical sheet comprises a polarizing film.

10. The transparent stereo display as claimed in claim 1, wherein each of the pixel structures further comprises:

a switch element, electrically connected to the scan line and the first signal line, wherein the first transparent conductive pattern is electrically connected to the switch element.

11. The transparent stereo display as claimed in claim 1, wherein each of the pixel structures further comprises:
a switch element, electrically connected to the data line and the second signal line, wherein the second transparent conductive pattern is electrically connected to the switch element.

12. The transparent stereo display as claimed in claim 1, wherein each of the pixel structures further comprises:
a first switch element, electrically connected to the scan line and the first signal line, wherein the first transparent conductive pattern is electrically connected to the first switch element; and
a second switch element, electrically connected to the data line and the second signal line, wherein the second transparent conductive pattern is electrically connected to the second switch element.

13. The transparent stereo display as claimed in claim 1, wherein each of the pixel structures further comprises:
a first switch element, electrically connected to the scan line and the first signal line, wherein the first transparent conductive pattern is electrically connected to the first switch element; and
a second switch element, electrically connected to the scan line and the second signal line, wherein the second transparent conductive pattern is electrically connected to the second switch element.

14. The transparent stereo display as claimed in claim 1, further comprising:
an image control device, electrically connected to the scan line and the data line of each of the pixel structures of the transparent display panel; and
a 2D/3D mode switch control device, electrically connected to the first signal line and the second signal line of the each of the pixel structures of the transparent display panel.

15. An operation method of a transparent stereo display, comprising:
providing a transparent stereo display as claimed in claim 1;
the first region and the second region of each of the pixel structures of the transparent display panel being in a transparent state when a 2D image is displayed in a 2D mode;
the first region of the each of the pixel structures of the transparent display panel being in a transparent state and the second region of the each of the pixel structures being in a shielding state when a 3D image is displayed in a 3D mode; and
the display region displays the 2D image in the 2D mode and displays the 3D image in the 3D mode.

16. The operation method of the transparent stereo display as claimed in claim 15, further comprising:
inputting a 2D image signal by an image control device to the display region of the pixel structures of the transparent display panel when the 2D image is displayed in the 2D mode so as to display the 2D image in the display region, and inputting a 2D control signal by a 2D/3D mode switch control device at the same time, such that the first region and the second region of the each of the pixel structures are in the transparent state; and
inputting a 3D image signal by the image control device to the display region of the pixel structures of the transparent display panel when the 3D image is displayed in the 3D mode so as to display the 3D image in the display region, and inputting a 3D control signal by the 2D/3D mode switch control device at the same time, such that the first region of the each of the pixel structures is in the transparent state and the second region of the each of the pixel structures is in the shielding state.

* * * * *